June 6, 1950 C. H. HOEPPNER 2,510,111
FREQUENCY MODULATION OF NEGATIVE TRANSCONDUCTANCE OSCILLATORS
Filed Feb. 26, 1948
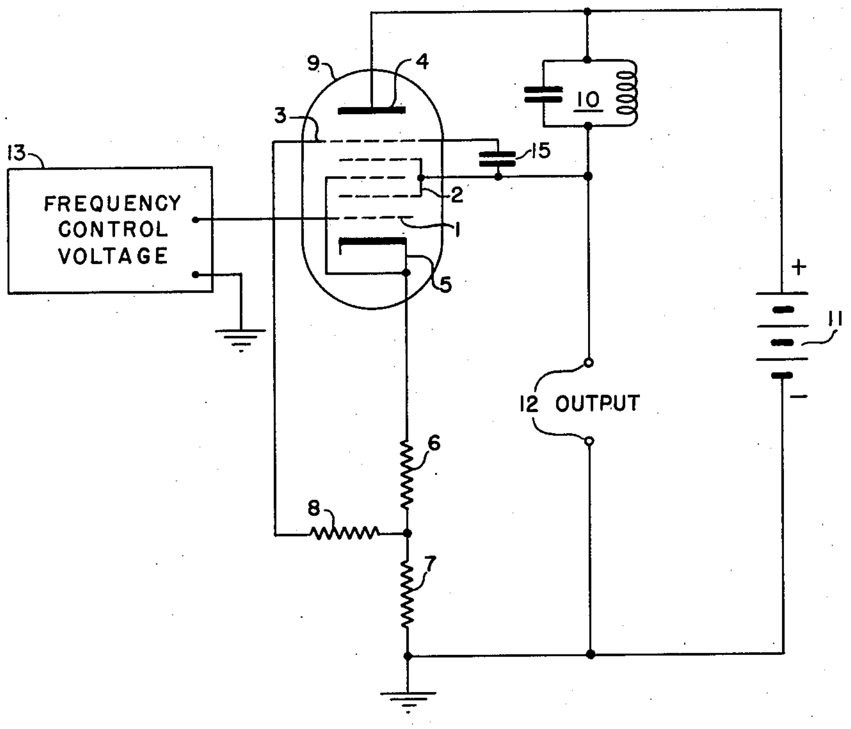
Inventor
CONRAD H. HOEPPNER
By N. S. Hanfeld
Attorney Patented June 6, 1950

2,510,111

UNITED STATES PATENT OFFICE 2,510,111

FREQUENCY MODULATION OF NEGATIVE TRANSCONDUCTANCE OSCILLATORS

Conrad H. Hoeppner, Essex, Md.

Application February 26, 1948, Serial No. 11,236

2 Claims. (Cl. 250—36)

(Granted under the act of March 3, 1883, as amended April 30, 1928; 370 O. G. 757)

This invention relates generally to negative transconductance oscillators and more particularly to frequency control and/or frequency modulation of such oscillators.

An object of this invention is to provide a new and simplified electronic frequency control for negative transconductance oscillators.

Another object of this invention is to control the frequency of a negative transconductance oscillator by the direct application of a suitable control voltage to an appropriate control electrode of the electron tube comprising the oscillator.

Other and more specific objects and attainments of the present invention will become apparent upon a careful consideration of the following detailed description when taken together with the accompanying drawing, the single figure of which shows circuit diagram of an exemplary embodiment of the invention.

Referring now in particular to the drawing, the negative transconductance oscillator therein exemplified comprises a single pentagrid vacuum tube component designated by reference numeral 9. Although tube 9 has in effect five grids, only three principal grids, 1, 2 and 3 are utilized. Hence, almost any standard vacuum tube having three equivalent grid electrodes and operational characteristics suitable for the production of negative transconductance may be substituted for the pentagrid tube 9.

According to the single embodiment of the invention, the anode 4 of tube 9 is directly connected to the positive terminal of a suitable plate supply source 11. The negative terminal of source 11 is grounded. Likewise, the second grid electrode 2 is connected to the same point of positive potential on source 11. In this case, however, the connection is made through an oscillatory circuit designated by reference numeral 10. Oscillatory circuit 10 is shown as comprising a simple parallel inductance capacitance connection. Either or both the constants of circuit 10 may be made adjustable to govern the mean operating frequency of the oscillator.

The cathode 5 is returned to ground through an unbypassed resistance path comprising resistances 6 and 7. Resistances 6 and 7 are chosen to provide tube 9 with a suitable biasing voltage and are unbypassed for the purpose of providing degeneration; and therefore for the purpose of stabilizing the frequency of operation against fluctuation in supply voltage 11.

To provide regenerative feedback for the production of oscillations, grid 2 is connected to grid 3 through the customary feedback capacitor 15.

Grid 3 is also returned to the junction point of cathode resistors 6 and 7 via high return resistor 8. This latter connection provides grid 3 with a biasing potential negative of the cathode 5 and thus provides grid 3 with the electron retarding force essential to the operation of a negative transconductance oscillator. In this regard, resistances 6 and 7 are, of course, proportioned to provide grid 3 with the proper operating bias.

An obvious alternative to using two separate resistances for resistors 6 and 7 lies in the substitution of a suitable potentiometer therefor. In this case, the resistance of the potentiometer connects cathode 5 to ground and the movable tap on the potentiometer connects to return resistance 8. The tap is then adjusted to provide grid 3 with the desired operating bias.

The output from the circuit can be taken at numerous points. That shown at 12 and taken between the second grid 2 and ground is only exemplary.

To provide electronic control of the frequency, a suitable control signal indicated at 13 is applied to the first grid 1. In using the invention for automatic frequency control such as that found in certain radio receivers, the frequency control voltage 13 would correspond to the control voltage derived from the frequency discriminator circuit customarily incorporated in such receivers. In using the invention for frequency modulation, the control voltage 13 corresponds to the modulation signal.

Neglecting for the moment the effect of the control voltage 13, the operation of the oscillator is as follows: As grid 2 is driven positive on the positive half cycles of the oscillatory output from circuit 10, grid 3 is driven positively at the same time by its coupling through capacitor 15 to grid 2. A positive increase in potential on grid 3 operates to repel fewer electrons to grid 2 thereby diminishing the current drawn by grid 2. Conversely, as grid 2 is driven negatively grid 3 follows negatively with it. A negative increase in potential on grid 3 operates to repel more electrons to grid 2 thereby increasing the current drawn by this grid. Grid 2 thus displays a negative resistance characteristic, and oscillations are sustained in circuit 10 by virtue of this characteristic.

The operation of the oscillator in the presence of a control signal impressed on grid 1 is substantially the same as above described with the exception that a positive increase in potential applied to grid 1 increases the frequency of operation and a negative increase in control potential decreases the frequency of operation. While the exact reasoning, or theory, behind these changes in frequency with changes in control potential are not fully understood at present, it is believed that the change in driving impetus and resonant damping on circuit 10 with changes in control signal are the controlling effects.

One reasonable explanation is that a positive increase in potential on grid 1 increases the density of the electron stream flowing within the tube. This increase in electron density results in a greater number of electrons being collected by grid 2 and therefore more driving impetus is delivered to the oscillator circuit 10 connected to grid 2. Also an increase in electron density results in more space current flow through the cathode circuit. This action causes a greater voltage drop to appear across the cathode resistance 6 which increases negatively the bias on the retarding electrode 3. Such increase in negative bias on electrode 3 further increases its ability to repel electrons to the accelerator grid 2 thus adding more impetus to the drive of grid 2 on the oscillatory circuit 10.

Conversely, a decrease in control potential applied to grid 1 decreases the density of the electron stream. This decrease in electron density results in a fewer number of electrons being collected by grid 2 which thus lowers the driving impetus to the oscillatory circuit. Likewise, a decrease in electron density decreases the space current flowing through cathode resistor 6 and thus decreases the negative bias on grid electrode 3. Such decrease in bias on grid 3 reduces its ability to repel electrons to the accelerator grid 3 thereby further diminishing the number of electrons collected by grid 2 and hence reduces the driving impetus imparted to the oscillatory circuit 10.

From the foregoing it will become apparent that one advantage of the present invention lies in its simplicity. It will be appreciated that frequency changes are accomplished through the direct application of a control signal to the oscillator tube and without the need of a reactance tube, or other circuit components usually associated with automatic frequency control oscillators. Accordingly, although I have shown and described a limited and specific embodiment of the present invention it must be understood that many modifications thereof are possible without exceeding the spirit of the invention.

The invention described herein may be manufactured and used by or for the Government of the United States of America for governmental purposes without the payment of any royalties thereon or therefor.

What is claimed is:

1. An oscillation generator comprising an electron discharge device having a cathode, a first grid, a second grid, a third grid and another electrode, an oscillatory circuit connected to said second grid, a feedback circuit between said second and third grids for the production of negative resistance, means including an unbypassed cathode resistance for biasing said first and third grids negatively with respect to the cathode, a resistance connection between the third grid and an intermediate point on said unbypassed cathode resistance and means for impressing a control signal on said first grid to control the frequency of oscillation.

2. An oscillation generator comprising an electron discharge device having a cathode, a first grid, a second grid, a third grid and another electrode, an oscillatory circuit connected to said second grid, a feedback circuit between said second and third grids for the production of negative resistance, means including an unbypassed cathode resistance path for biasing said first grid negatively with respect to said cathode, conductive means returning said third grid to an intermediate point on said resistance, and means for impressing a control signal on said first grid to control the frequency of oscillation.

CONRAD H. HOEPPNER.

REFERENCES CITED

The following references are of record in the file of this patent:

UNITED STATES PATENTS

| Number | Name | Date |
|---|---|---|
| 1,995,164 | Whitaker | Mar. 19, 1935 |
| 2,180,369 | Philpott | Nov. 21, 1939 |
| 2,226,561 | Herold | Dec. 31, 1940 |
| 2,389,004 | Schroeder | Nov. 13, 1945 |
| 2,394,427 | Clark et al. | Feb. 5, 1946 |